United States Patent
Carneheim et al.

(10) Patent No.: US 6,215,798 B1
(45) Date of Patent: Apr. 10, 2001

(54) MULTI-FRAME SYNCHRONIZATION FOR PARALLEL CHANNEL TRANSMISSIONS

(75) Inventors: Caisa Carneheim, Cary, NC (US); Per-Olof Anderson, Stockholm (SE); Martin Bakhuizen, Kista (SE); Lars Malm, Solna (SE)

(73) Assignee: Telefonaktiebolaget LM Ericsson (publ) (SE)

( * ) Notice: Subject to any disclaimer, the term of this patent is extended or adjusted under 35 U.S.C. 154(b) by 0 days.

(21) Appl. No.: 08/943,067

(22) Filed: Oct. 2, 1997

Related U.S. Application Data

(60) Provisional application No. 60/030,015, filed on Nov. 1, 1996.

(51) Int. Cl.[7] ........................................................ H04J 3/06
(52) U.S. Cl. .............................................................. 370/515
(58) Field of Search .................................. 370/515, 465, 370/468, 342, 350; 375/200, 367

(56) References Cited

U.S. PATENT DOCUMENTS

| | | | |
|---|---|---|---|
| 4,004,100 | * | 1/1977 | Takimoto .............................. 370/350 |
| 4,791,653 | | 12/1988 | McFarland et al. . |
| 4,939,734 | | 7/1990 | Johannes . |
| 5,237,586 | * | 8/1993 | Bottomley ............................ 375/200 |
| 5,258,980 | * | 11/1993 | Maebara et al. ...................... 370/350 |
| 5,291,515 | | 3/1994 | Yoshitaka . |
| 5,392,289 | | 2/1995 | Varian . |
| 5,581,547 | * | 12/1996 | Umeda et al. ........................ 370/342 |
| 5,727,018 | * | 3/1998 | Wolf et al. ............................ 375/200 |
| 5,862,132 | * | 1/1999 | Blanchard et al. ................... 370/515 |
| 5,923,667 | * | 7/1999 | Poiraud et al. ....................... 370/515 |
| 5,926,471 | * | 7/1999 | Shoji ..................................... 370/515 |

FOREIGN PATENT DOCUMENTS

| | | |
|---|---|---|
| 0 659 001 | 6/1995 | (EP) . |
| 9531878 | 11/1995 | (WO) . |
| 9618248 | 6/1996 | (WO) . |
| WO 96/18248 | 6/1996 | (WO) . |

OTHER PUBLICATIONS

Shu Lin, et al., "Self–Sychronizing Outer Codes for the TDRSS Decoder[1]", Nov. 28–Dec. 1, 1983, pp. 1050–1053.

* cited by examiner

*Primary Examiner*—Melvin Marcelo
*Assistant Examiner*—Phuongchau Ba Nguyen
(74) *Attorney, Agent, or Firm*—Jenkens & Gilchrist

(57) ABSTRACT

The present invention comprises a method and apparatus for synchronizing data frames from a wide bandwidth data stream which is divided up and transmitted across a plurality of parallel channels in a mobile telephone system. Prior to transmitting the data frames, a transmit synchronizer synchronizes data frames aligned in the same position in different parallel channels by inserting a common bit from a repeating PN synchronization sequence into the aligned data frames. Upon receiving the data frames at a destination, a receive synchronizer extracts the synchronization bit from each data frame. A series of sequential bits from each parallel channel is compared against the original PN synchronization sequence to identify the position of each data frame relative to the other data frames and reconstructs the original wide bandwidth data stream.

2 Claims, 4 Drawing Sheets

US 6,215,798 B1

MULTI-FRAME SYNCHRONIZATION FOR PARALLEL CHANNEL TRANSMISSIONS

RELATED APPLICATIONS

This Application claims the benefit of prior filed and co-pending U.S. Provisional Application Serial No. 60/030,015, entitled "Multi-frame Synchronization Control", filed Nov. 1, 1996 (Inventors: Peter Galyas, Stefan Jung, Martin Bakhuizen, Caisa Carneheim, Per-Olof Anderson, and Lars Malm).

BACKGROUND OF THE INVENTION

1. Technical Field of the Invention

The present invention pertains in general to synchronization of data frames transmitted across multiple parallel channels, and more particularly, to the use of pseudo noise sequences to align data frames transmitted across multiple parallel channels.

2. Description of Related Art

To achieve higher data transmission rates in mobile telephone systems, data frames from a wide bandwidth communication channel are sequentially divided up for transmission across multiple narrow bandwidth communication channels as described in Patent Cooperation Treaty documents WO 96/18248 and WO 95/31878. Multiple communication channels are required due to the narrower bandwidth. Data frames transmitted over the communication channels are reconstructed at a destination to form the original data stream. Various physical channels of the mobile telephone system are independent from one another, and propagation delay times through the mobile telephone system vary from one physical channel to another. As data frames are received at the destination, they are reconstructed in the appropriate order to form the original data stream.

To be able to reconstruct the data frames in the appropriate order in the receiver, inband information is inserted into each data frame. The inband information typically consists of three bits identifying a parallel channel number which the data frame has been assigned to, and synchronization information identifying the position of the data frame relative to data frames assigned to other parallel channels. Synchronization information is required because the propagation delay through the mobile telephone system varies between different physical channels. The synchronization information is used to insure that data frames from one parallel channel are aligned with appropriate data frames from another parallel channel.

As the data frames are received at the destination, they are reassembled into the appropriate parallel channel as determined by the inband parallel channel identification information. Although the parallel channel affiliation of each data frame is immediately known once it is received at the destination, the alignment of data frames from one parallel channel to another needs to be determined from a series of data frames from the same parallel channel. One solution uses a single bit to synchronize the data frames. For longer delay variances, however, a single bit is insufficient. Another solution uses a series of bits comprising a logical one followed by logical zeros. Synchronization between the data frames is established only after a sufficient number of data frames are received. Once the data frames from the parallel channels are aligned, the original data stream is reconstructed.

A first drawback associated with the current method of synchronization is that a large number of data frames from one parallel channel must be received before synchronization is achieved.

A second drawback involves bit errors which occur frequently on the air interface of mobile telephone systems. The current method of synchronization is not robust against bit errors and synchronization can be lost.

A third drawback is the requirement that parallel channel identification information must be inserted into each of the data frames. This information is "overhead" which reduces the overall bandwidth of the transmission.

It would be advantageous, therefore, to devise a method and apparatus for synchronizing data frames without requiring receipt of a large number of data frames. It would also be advantageous if such a method and apparatus provided better protection against bit errors. Furthermore, it would be advantageous if such a method and apparatus eliminated the need for inserting parallel channel number information into the data frames.

SUMMARY OF THE INVENTION

The present invention comprises a method and apparatus for synchronizing data frames from a wide bandwidth data stream which is divided up and transmitted across a plurality of parallel channels in a mobile telephone system. Alignment between equally positioned data frames within different parallel channels is achieved by inserting a common bit from a repeating pseudo noise synchronization sequence into equally positioned data frames before transmission. Upon receiving the data frames at a destination receiver, the synchronization bit is extracted from each data frame. A series of sequential synchronization bits from each parallel channel is compared against the original pseudo noise synchronization sequence to identify the position of each data frame relative to the other data frames in order to reconstruct the original wide bandwidth data stream.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
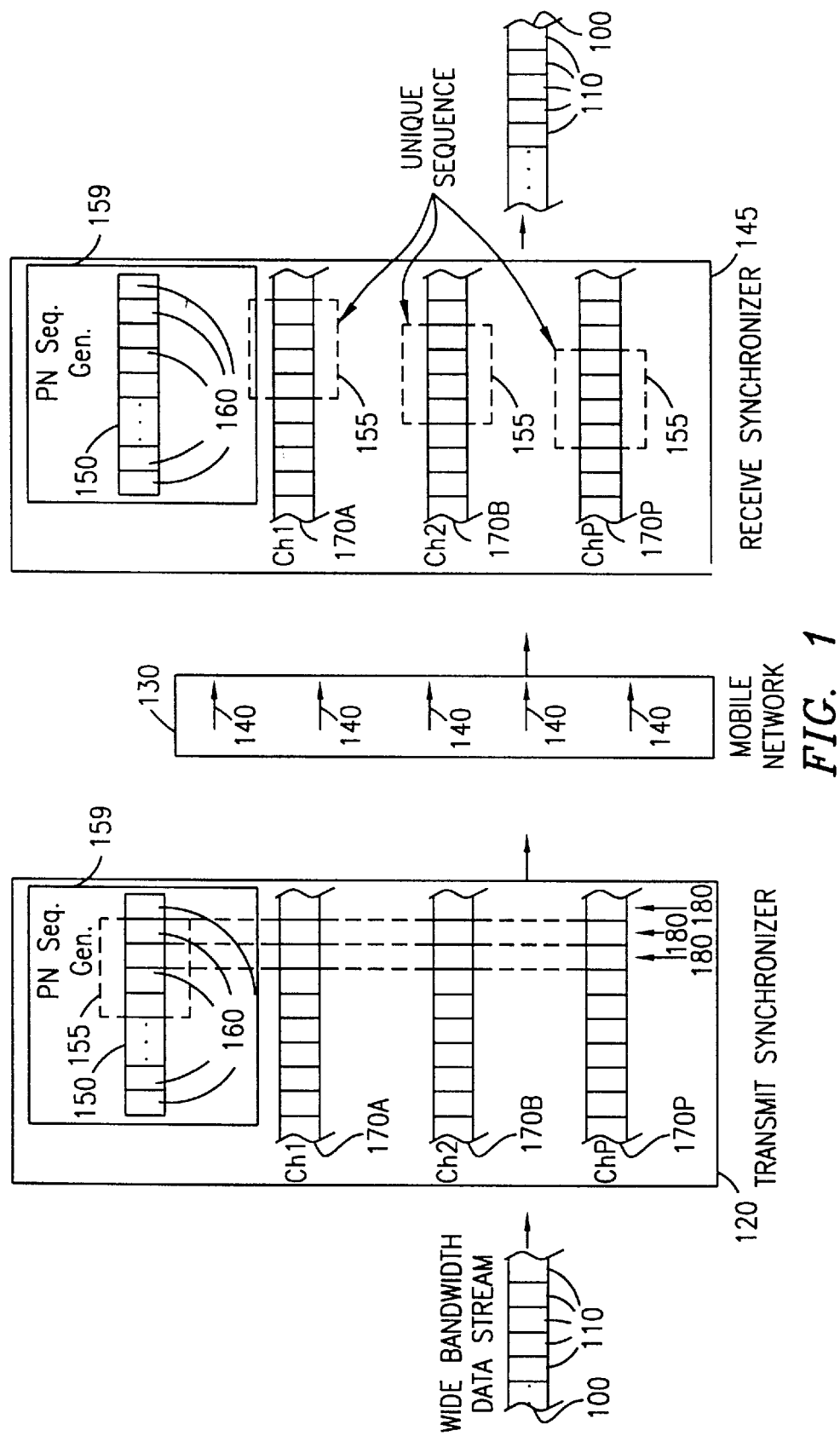
FIG. 1 is a functional block diagram of a first embodiment of the present invention, wherein, a single pseudo noise sequence is used as a synchronization sequence.

Referring now to FIG. 1, there is illustrated a functional block diagram of a first embodiment of the present invention. A wide bandwidth data stream 100 comprised of data frames 110 enters a transmit synchronizer 120. The transmit synchronizer 120 demultiplexes the wide bandwidth data stream 100 and assigns individual data frames 110 to distinct parallel channels 170A–P The transmit synchronizer 120 inserts parallel channel identity information consisting of identification bits and synchronization information into each data frame 110. The transmit synchronizer 120 then transmits the data frames 110 assigned to the parallel channels 170A–P across the mobile telephone network 130. The mobile telephone network 130 comprises a plurality of physical channels 140. Data frames 110 are received at a destination receiver and enter a receive synchronizer 145. The receive synchronizer 145 extracts parallel channel identity and synchronization information from each data frame 110 and reconstructs the original wide bandwidth data stream 100 by multiplexing the individual data frames 110 into a single data stream 100.

The transmit synchronizer 120 and the receive synchronizer 145 provide a means to generate a pseudo noise (PN) synchronization sequence 150 comprised of individual bits 160. PN sequences are well known in the industry and are described in a book entitled, "Spread Spectrum Communications," co-authored by Marvin K. Simon, Jim K. Omura, Robert A. Scholtz and Barry K. Levitt. The PN sequence 150 is generated by PN sequence source 159 such as being shifted out of a memory. A PN generator such as a microprocessor can also be programed to generate the PN sequence 150 in the transmit synchronizer 120 and the receive synchronizer 145. The sequence 150 is K bits in length, wherein K is determined by the expression $K \geq 2D+1$, and D is equal to the maximum propagation delay difference between any physical channels 140 through the mobile telephone network 130, as measured by the number of data frames which can be transmitted on one physical channel 140 through the mobile telephone network 130 during the propagation delay difference. There exist such PN sequences for any K, for example, a thirteen bit PN sequence is "0010011011110" and a fifteen bit PN sequence is "000100110101111."

A property of PN sequences involves a sequential series of bits within the PN sequence known as a unique sequence 155. The unique sequence 155 is the smallest number, N, of bits necessary to determine position of a bit 160 within the PN sequence 150 relative to other bits 160 in the PN sequence 150. Although the number of bits, N, forming the unique sequence 155 varies with the number of bits, K, forming the PN sequence 150, in a carefully chosen PN sequence, N is much smaller than K. It is understood that the present invention is not limited to any particular value K.

As data frames 110 enter the transmit synchronizer 120, the data frames 110 are sequentially assigned to a plurality of parallel channels 170A–P. Data frames assigned to different parallel channels 170A–P which are aligned in the same sequential position in the plurality of parallel channels 170A–P form a data frame set 180. Prior to transmission across the mobile telephone network 130, the transmit synchronizer 120 inserts information into each data frame 110 identifying the parallel channel to which the respective data frame 110 has been assigned. For example, in the case where eight channels are available, the channel identity information consists of three bits. Furthermore, data frames in each set of data frames 180 are inserted with a single bit 160 from the PN synchronization sequence 150 where sequential sets of data frames 180 receiving sequential bits 160 from the synchronization sequence 150. Once the sequence is exhausted, the sequence 150 wraps around and is repeated. The parallel channels 170A–P are then transmitted over the plurality of physical channels 140 comprising the mobile telephone network 130. An exemplary mobile telephone network 130 can include a plurality of base stations communicating with a plurality of wireless telephones via an air interface, and further communicating with each other and a public switched telephone network via base station controller and mobile switching centers.

Upon arriving at the destination, the parallel channel identity information is extracted from each data frame 110 and parallel channels 170A–P are identified. Due to the varying propagation delay on the physical channels 140, however, the data frames 110 are not aligned to form the sets of data frames 180 necessary to reconstruct the original wide bandwidth data stream 100. The receive synchronizer 145, therefore, extracts the PN synchronization bit 160 from each data frame 110 and identifies a unique sequence 155 of N bits for each parallel channel 170A–P. The receive synchronizer 145 compares the unique sequences 155 against the PN sequence 150 and identifies the position of each unique sequence 155 in the PN sequence 150. The results of this comparison are used to align the data frames in the parallel channels 170A–P. Once the data frames 110 comprising the parallel channels 170A–P are aligned, the original wide bandwidth data stream 100 is reconstructed by removing the synchronization bit 160 and the parallel channel identity information and multiplexing the data frames 110 belonging to the same set of data frames 180. Subsequent bits 160 extracted from subsequent data frames 110 create a sliding window of bits 160, which form the unique sequences 155 of the PN sequence 150.

In an alternative embodiment to the embodiment described in FIG. 1, each parallel channel 170A–P is associated with a distinct physical channel 140 according to a predefined assignment. Whereas in the first embodiment each parallel channel 170A–P could be transmitted over any physical channel 140 of the mobile telephone network 130 each parallel channel 170A–P in the second embodiment is assigned to a specific physical channel 140. By imposing this requirement, the receive synchronizer 145 is aware of which parallel channel 170A–P is received across which physical channel 140 of the mobile telephone network 130. Thus, information identifying the parallel channel to which the data frames 110 are assigned does not need to be inserted into the data frame 110.

An example of predefined assignment in a Time Division Multiple Access System is to assign the first parallel channel 170A to the lowest number time slot with subsequent parallel channels 170B–P assigned to subsequent time slots. The predefined assignment can be changed as long as both the transmit synchronizer 120 and the receive synchronizer 145 are both informed of the change by signaling or stated rules.

Figure 2:
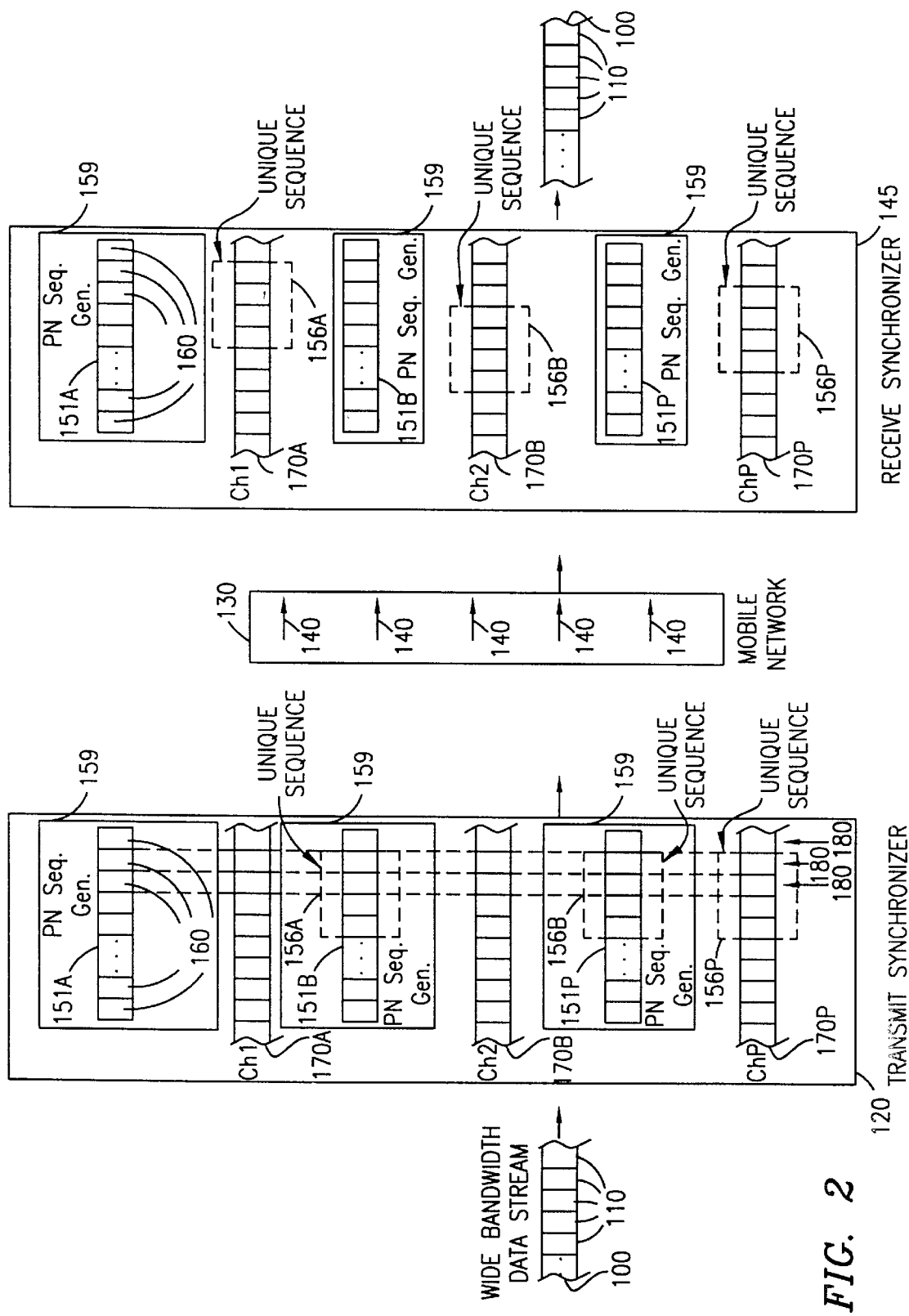
FIG. 2 is a functional block diagram of a second embodiment of the present invention, wherein, each parallel channel is assigned a distinct pseudo noise synchronization sequence.

Referring now to FIG. 2, there is illustrated a functional block diagram of a second embodiment of the present invention. This embodiment functions in a manner consistent with that of the first embodiment shown in FIG. 1, except that separate parallel channel identity information bits are not inserted into the data frames 110. Instead, each parallel channel 170A–P is assigned a distinct PN sequence 151A–P. Both the transmit synchronizer 120 and the receive synchronizer 145 are programed, either in memory or through PN sequence generator, with copies of the PN sequences 151A–P and can determine the relative position of any bit 160 from any PN sequence 151A–P relative to bits 160 from any other PN sequences 151A–P. For a given length of bits K there is a fixed number of distinct PN sequences with the desired properties. The number of distinct PN sequences increases as the length K increases. Therefore, it may be necessary to increase the length K of the PN sequences used to obtain enough PN sequences to accommodate the number of parallel channels 170A–P.

Bits 160 from the PN sequences 151A–P are inserted into, and extracted from, the data frames 110 in a manner consistent with that described for FIG. 1 except that different PN sequences 151A–P are used for each parallel channel 170A–P. The receive synchronizer identifies which parallel channel 170A–P is transmitted across which physical channel 140 by matching the PN sequence received on each physical channel 140 with copies of the PN sequences 151A–P assigned to the parallel channels 170A–P. Additionally, the receive synchronizer compares unique sequences 156A–P with the PN sequences 151A–P to align data frames 110 of the various parallel channels 170A–P.

The embodiments shown in FIG. 1 and FIG. 2 insert a single bit from the PN sequence into each data frame. To provide better protection against bit errors, two or more bits from the PN synchronization sequence can be inserted into each data frame. This requires a longer PN sequence since multiple bits are used on each data frame but increases the likelihood that bit errors will be detected. Additionally, since the data frame is subdivided and interleaved with other data frames for transmission across the mobile telephone system, still further protection against bit errors is possible by inserting the two or more bits into non-consecutive bit positions in the data frame. Thus, the PN sequence bits are transmitted at different times decreasing the likelihood that all the bits will be subjected to bit errors.

Figure 3:
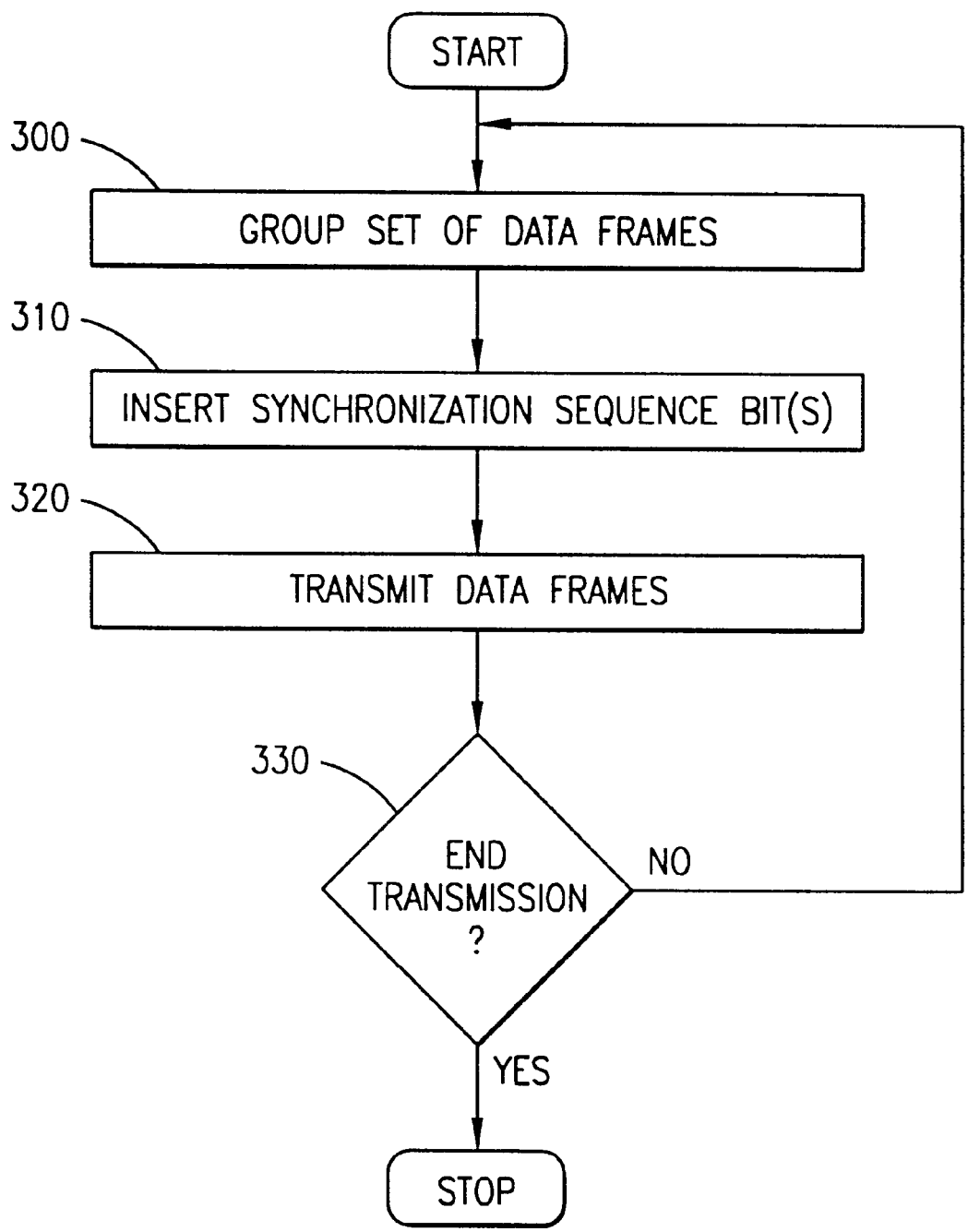
FIG. 3 is a flow diagram of a method for synchronizing and transmitting data frames, in accordance with the present invention.

Referring now to FIG. 3, there is illustrated a flow diagram of a method for synchronizing and transmitting data frames in accordance with the present invention. Data frames comprising the wide bandwidth data stream are assigned to parallel channels and grouped into data frame sets (step 300). Each data frame within a data frame set is inserted with at least one bit from the PN synchronization sequence (step 310). In one aspect of the invention, a single bit is inserted into each data frame of the data frame set. In another aspect, more than one bit is inserted in the set of data frames. In yet another aspect, multiple bits are inserted in different positions within the data frame. In still another aspect, each parallel channel is assigned a distinct PN synchronization sequence.

Once the synchronization information is inserted into the data frames, the data frames are transmitted across the mobile telephone network (step 320). A determination is made as to whether there are more data frames to transmit (step 330). If there are no further data frames to transmit, the process terminates. Otherwise, the process is repeated for the next set of data frames using subsequent bits from the PN synchronization sequence.

Figure 4:
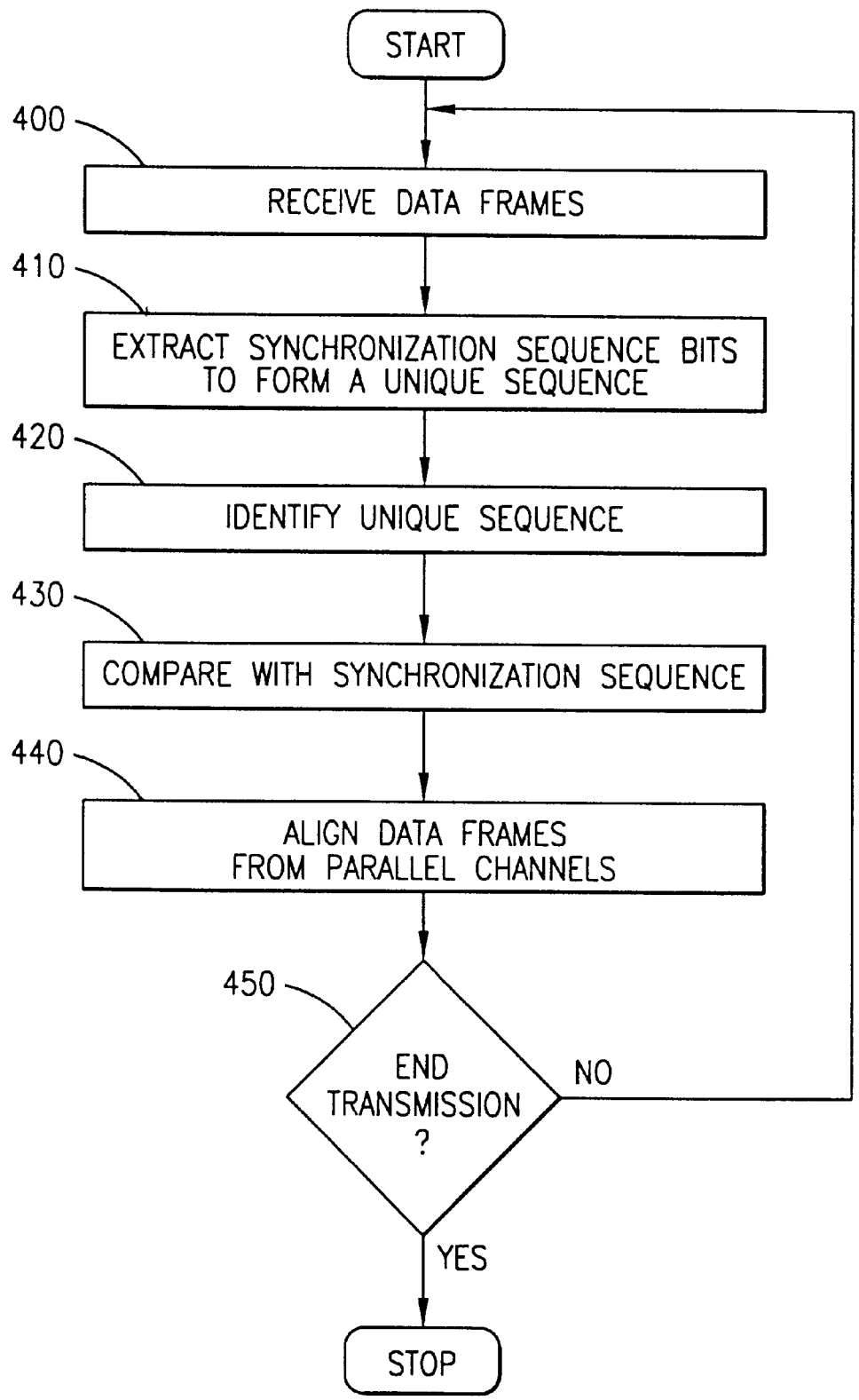
FIG. 4 is a flow diagram of a method for receiving and synchronizing data frames, in accordance with the present invention.

Referring now to FIG. 4, there is illustrated a flow diagram of a method for receiving and synchronizing data frames in accordance with the present invention. Upon receiving data frames from the mobile telephone network (step 400), the PN synchronization bits are extracted from each data frame (step 410) to form a unique sequence. The unique sequence for each parallel channel is compared against the PN synchronization sequence assigned to the parallel channel (step 430) to determine the position of each data frame relative to the others. The data frames from the various parallel channels are then aligned (step 440) and the original data stream is reconstructed. A determination is made as to whether the transmission has ended (step 450). If the transmission has ended the process terminates; otherwise, the process repeats for the next set of data frames.

Although the description of the present invention described the use of parallel channels comprising different time slots of a carrier frequency in a Time Division Multiple Access system, the present invention is also applicable to other systems such as a Code Division Multiple Access system wherein parallel channels comprise different spreading codes of a carrier frequency, for example, Walsh Codes.

Although embodiments of the method and apparatus of the present invention have been illustrated in the accompanying Drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A method for synchronizing data frames for transmission across a plurality of parallel channels comprising the steps of:

receiving a sequential input stream of data frames;

grouping a set of data frames received in the input stream for transmission across the plurality of parallel channels wherein each data frame is transmitted on a separate parallel channel including grouping the data frames received in the input stream into a sequence of sets of data frames, providing the data frames of each set for transmission across respective ones of the parallel channels such that each of the parallel channels carries a sequence of data frames provided from the sequence of sets and, for at least one of said channels, distributing across a plurality of the data frames carried thereby a plurality of bits defining a predetermined repeating PN synchronization sequence; and inserting at least one bit from a repeating PN synchronization sequence into each data frame.

2. An apparatus for synchronizing data frames for transmission across a plurality of parallel channels in a communication system, comprising:

an input for receiving a sequential input stream of data frames;

means for generating a repeating PN synchronization sequence; and a transmit synchronizer coupled to said input for grouping sets of data frames received in the input stream for transmission across the plurality of parallel channels with each of the data frames within each set being transmitted across a separate parallel channel, the transmit synchronizer inserting bits from the repeating PN synchronization sequence into the data frames;

wherein said transmit synchronizer is operable for:
grouping the data frames received in the input stream into a sequence of sets of data frames;
providing the data frames of each set for transmission across respective ones of the parallel channels such that each of the parallel channels carries a sequence of data frames provided from the sequence of sets; and
for at least one of said channels, distributing across a plurality of the data frames carried thereby a plurality of bits defining a predetermined repeating PN synchronization sequence.

* * * * *